US008432492B2

(12) United States Patent
Deigmoeller et al.

(10) Patent No.: US 8,432,492 B2
(45) Date of Patent: Apr. 30, 2013

(54) METHOD OF ADAPTING VIDEO IMAGES TO SMALL SCREEN SIZES

(75) Inventors: Joerg Deigmoeller, Budenheim (DE); Gerhard Stoll, Zolling (DE); Renate Stoll, legal representative, Zolling (DE); Melanie Stoll, legal representative, Zolling (DE); Christoph Stoll, legal representative, Zolling (DE); Helmut Neuschmied, Graz (AT); Andreas Kriechbaum, Graz (AT); Jose Bernardo Dos Santos Cardoso, Aveiro (PT); Fausto Jose Oliveira de Carvalho, Aveiro (PT); Roger Salgado de Alem, Aveiro (PT); Benoit Huet, Roquefort les Pins (FR); Bernard Merialdo, Valbonne (FR); Remi Trichet, Valbonne (FR)

(73) Assignees: Institut fuer Rundfunktechnik GmbH, Munich (DE); Joanneum Research Forschungsgesellschaft mbH Institute of Information Systems, Graz (AT); Portugal Telecom Inovacao, SA, Aveiro (PT)

( * ) Notice: Subject to any disclaimer, the term of this patent is extended or adjusted under 35 U.S.C. 154(b) by 22 days.

(21) Appl. No.: 12/933,539

(22) PCT Filed: Mar. 20, 2008

(86) PCT No.: PCT/EP2008/002266
§ 371 (c)(1),
(2), (4) Date: Dec. 13, 2010

(87) PCT Pub. No.: WO2009/115101
PCT Pub. Date: Sep. 24, 2009

(65) Prior Publication Data
US 2011/0096228 A1    Apr. 28, 2011

(51) Int. Cl.
*H04N 7/26*    (2006.01)

(52) U.S. Cl.
USPC ............................................................ 348/581

(58) Field of Classification Search .................. 348/581, 348/582, 580, 441, 448, 556, 565; 382/173; 345/619, 630
See application file for complete search history.

(56) References Cited

U.S. PATENT DOCUMENTS

| 6,483,521 | B1 * | 11/2002 | Takahashi et al. | 345/630 |
| 7,260,261 | B2 * | 8/2007 | Xie et al. | 382/173 |
| 7,471,827 | B2 * | 12/2008 | Xie et al. | 382/173 |

(Continued)

FOREIGN PATENT DOCUMENTS
WO    2006 056311    6/2006

*Primary Examiner* — Paulos M Natnael
(74) *Attorney, Agent, or Firm* — Oblon, Spivak, McClelland, Maier & Neustadt, L.L.P.

(57) ABSTRACT

To improve a cropping system by obtaining coverage of a wide range of contents for smaller sized displays of handheld devices, a method starts from a metadata aggregation and corresponding video, e.g. in post-production, program exchange and archiving, wherein (a) video is passed to a video analysis to deliver video, e.g. by use of motion detection, morphology filters, edge detection, etc., (b) separated video and metadata are combined to extract important features in a context wherein important information from the metadata is categorized and used to initialize a dynamically fitted chain of feature extraction steps adapted to the delivered video content, (c) extracted important features are combined to define regions of interest (ROI) which are searched in consecutive video frames by object tracking, the object tracking identifies a new position and deformation of each initialized ROI in consecutive video frames and returns this information to the feature extraction thereby obtaining a permanent communication between the feature extraction and the object tracking, (d) one or plural ROIs are extracted and input video frame by video frame into a cropping step (e); based on weighting information a well composed image part is cropped by classifying the supplied ROIs by importance, and (f) the cropped image area(s) are scaled to the desired small screen size.

11 Claims, 7 Drawing Sheets

U.S. PATENT DOCUMENTS

| | | | | |
|---|---|---|---|---|
| 7,821,545 | B2 * | 10/2010 | Sato | 348/222.1 |
| 8,085,855 | B2 * | 12/2011 | Bennett | 375/240.26 |
| 2005/0203927 | A1 | 9/2005 | Sull et al. | |
| 2006/0139371 | A1 | 6/2006 | Lavine et al. | |
| 2006/0215753 | A1 | 9/2006 | Lee et al. | |
| 2006/0239645 | A1 | 10/2006 | Curtner et al. | |

\* cited by examiner adapted video on small display higher resoluted video

METHOD OF ADAPTING VIDEO IMAGES TO SMALL SCREEN SIZES

The invention to which this application relates is a method of adapting video images to small screen sizes, in particular to small screen sizes of portable handheld terminals.

Mobile TV (Mobile Television) is a growing and certainly promising market. It allows the reception of Television signals on small portable devices like cell phones, smartphones or PDAs (Personal Digital Assistant). The display on the screen of those small portable devices does not provide such a detailed image as it is known from stationary TV sets at home (currently SDTV, Standard Definition Television). Irrespective of such essential difference of viewing conditions, the same contents are mainly displayed on the screens of both, mobile and stationary TV systems. However, producing a separate programme for mobile TV would cause a huge expenditure of human sources as well as an increase of costs which broadcasters hardly can bring up.

To overcome such uncomfortable situation some proposals were made to adapt video contents having a high image resolution to smaller displays by cropping parts out. Such proposals are dealing with the automatic detection of regions of interest (ROI) based on feature extraction with common video analysis methods. The detected regions of interest in a video signal are used to find an adequate crop (cutting) area and to compose a new image containing all relevant information adapted to displays of handheld devices.

However, such known cropping systems are inadequately dealing with a wide range of contents since they are missing semantically knowledge and thus general defined methods.

It is the object of the present invention to improve a cropping system by obtaining the coverage of a wide range of contents for smaller sized displays of handheld devices.

The above object is solved by a method starting from a metadata aggregation and the corresponding video, e.g. in post-production, programme exchange and archiving, wherein (a) the video is passed through to a video analysis to deliver video, e.g. by use of motion detection, morphology filters, edge detection, etc., (b) the separated video and metadata are combined to extract important features in a context wherein important information from the metadata is categorised and is used to initialise a dynamically fitted chain of feature extraction steps adapted to the delivered video content, (c) extracted important features are combined to defione regions of interest (ROI) which are searched in consecutive video frames by object tracking, said object tracking identifies the new position and deformation of each initialised ROI in consecutive video frames and returns this information to the feature extraction thereby obtaining a permanent communication between said feature extraction and said object tracking, (d) one or several ROIs are extracted and inputted video frame by video frame into a cropping step (e) based on weighting information a well composed image part is cropped by classifying said supplied ROIs by importance, and (f) said cropped image area(s) are scaled to the desired small screen size.

Advantageously, the invention provides a feature extraction in video signals with the aid of available metadata to crop important image regions and adapt them on displays with lower resolution.

Specific embodiments of the invention are now described with reference to the accompanying drawings wherein FIG. 1 illustrates a schematic block diagram of the overall system performing the method of the invention;

The invention is aiming at file-based production formats (based on a shift from tape records to tapeless records) which are allowing the usage of various metadata for post-production, programme exchange and archiving. Such metadata are included in a container format containing video data and metadata. Such metadata include content-related-information which describes the type of genre as well as specific information related to details of the production procedure. The generated metadata are made available in a container format containing video and metadata. Such container format allows a multiplex of different data in a synchronised way, either as file or stream. The combination of metadata information with known feature extraction methods is resulting in the inventive method which is individually adaptable to a wide range of contents.

Figure 1:
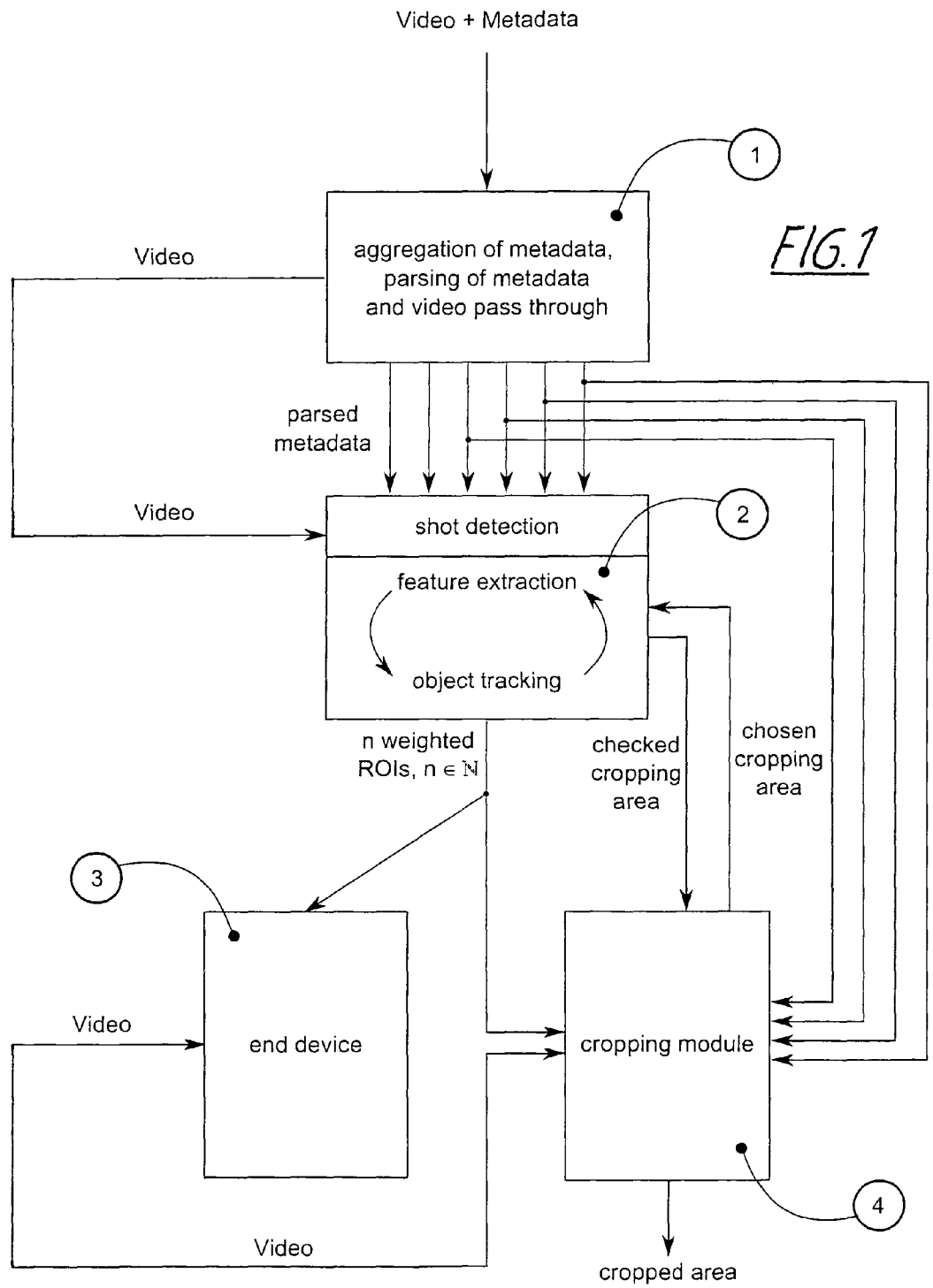

The overall system according to FIG. 1 is illustrating a block diagram comprising the three blocks 1, 2 and 3. The video and metadata are inputted into block 1. The metadata can be aggregated from one or several sources. In a further step, the collection of data is parsed and important information is categorized in a useful structure. The resulting data is sent to block 2 and partly to block 3. The video content is passed via "Video"-output line to block 2. Block 2 is the feature extraction module performing the step of shot detection and the step of feature extraction and following object tracking as is described in more detail with reference to FIG. 3. The feature extraction as performed by block 2 results in n extracted ROIs which are fed to block 3. Block 3 is the cropping module producing the cropping area to be displayed on smaller sized displays of handheld devices. This module can be placed either on production side or in the end device.

Figure 2:
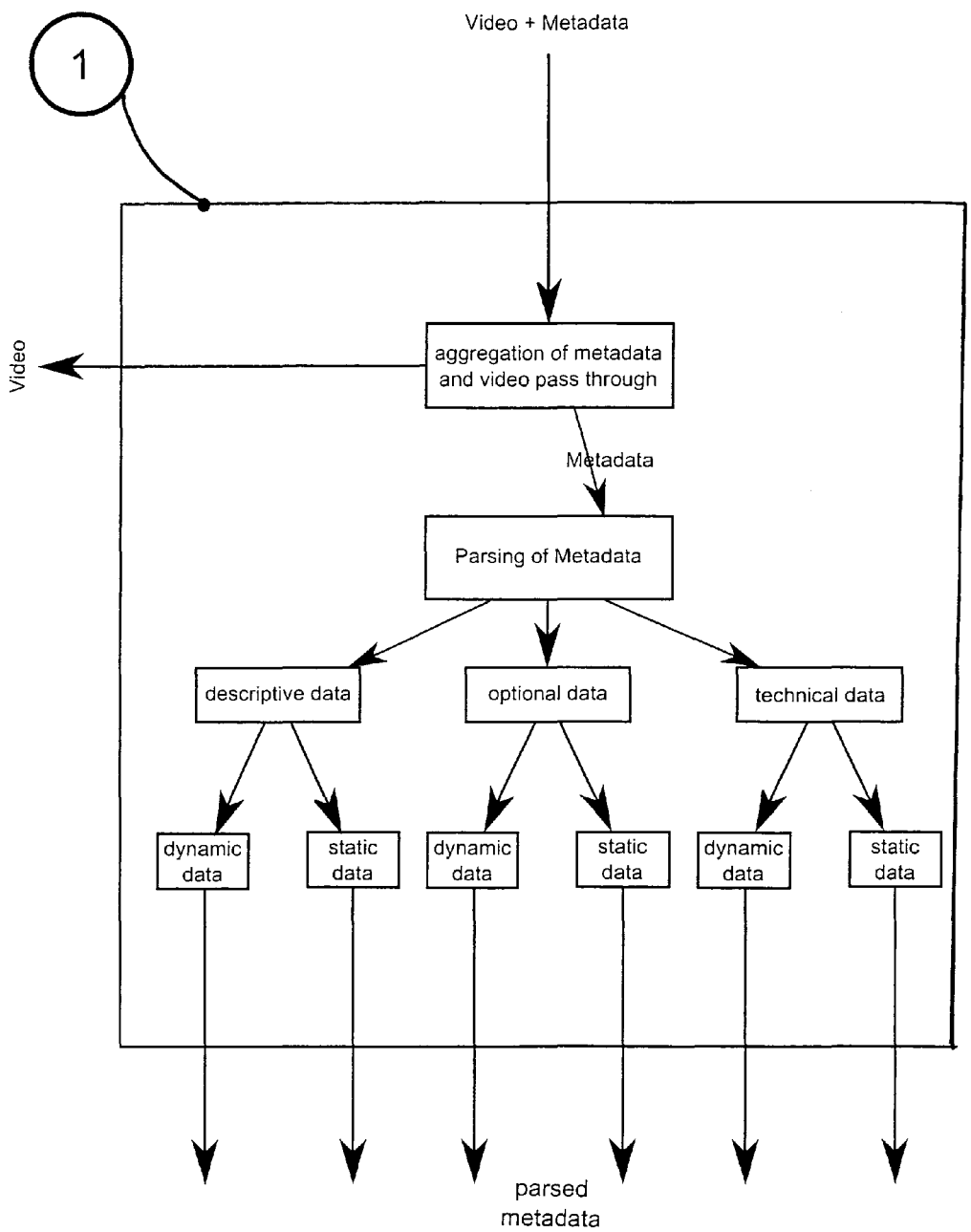
FIGS. 2 to 5 illustrate the various blocks shown in the system of FIG. 1.

Block 1 performes the aggregation and parsing of metadata as shown in detail in FIG. 2. The video is passed through to the video analysis (see FIG. 1), while the metadata is parsed (analysed) and important information is categorised in a useful structure. Metadata is a content related description using an easy file structure, e.g. XML (Extensible Markup Language). Here, it is roughly distinguished in descriptive data, technical data and optional data. Descriptive data is a content related description. This information can be either static or dynamic. Dynamic means data changing in time is synchronised to the video content, e.g. description of a person appearing in the video. Static data is a description which is valid for the entire video, e.g. type of genre. On the other hand, technical data is related to the format of the essence and can also be static or dynamic. It describes the format of the embedded video. Optional metadata does not describe production-specific technical or descriptive metadata but can give necessary information for the adaption process, e.g. where the copping will be done (on production side or on the end device) or properties of the final video (resolution fame rate, et.).

All three metadata types, namely technical, descriptive and optional data are provided to the feature extraction modul (Block 2).

Figure 3:
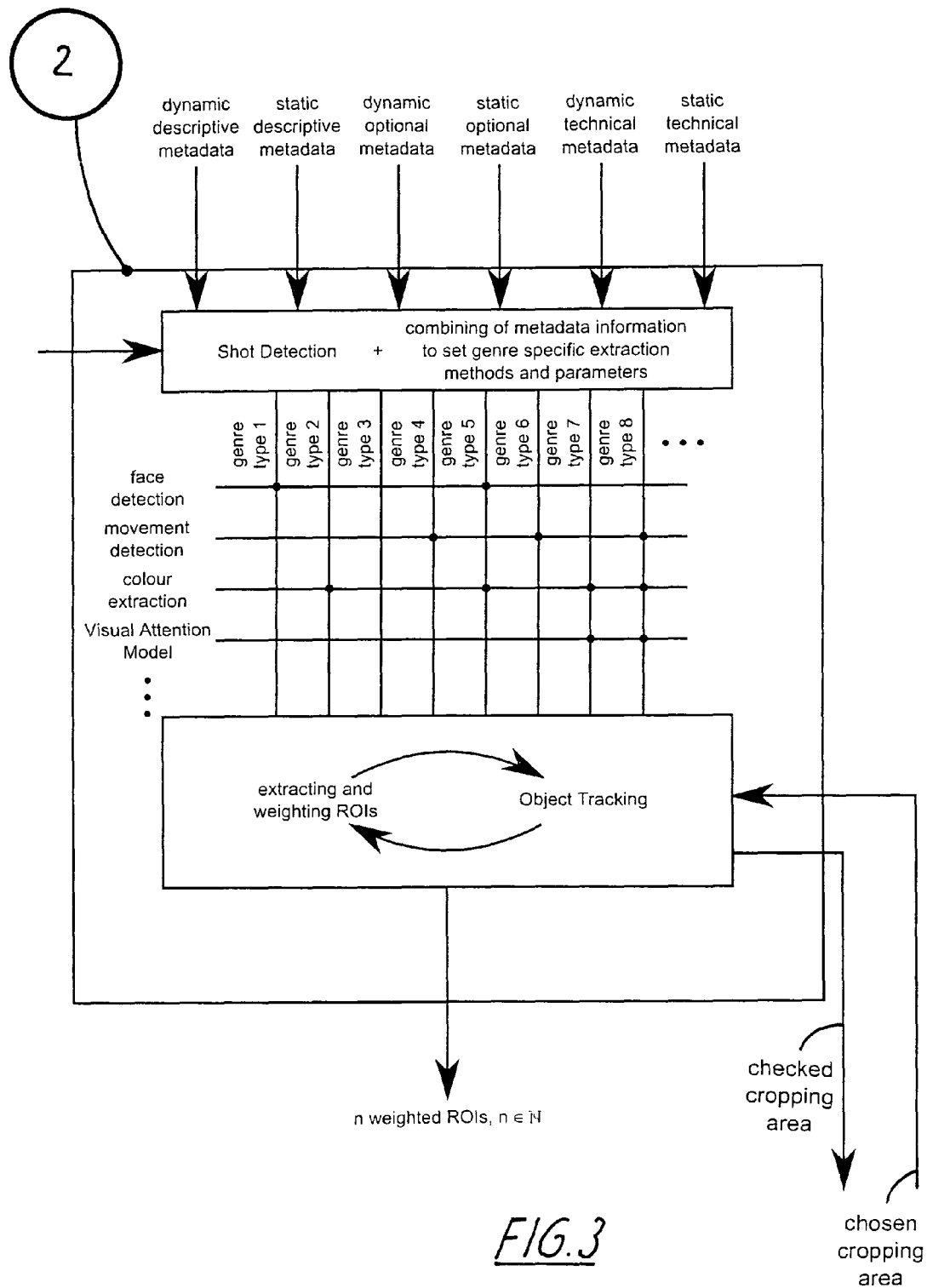

Block 2 which is the feature extraction module is shown in detail in FIG. 3. The video and metadata delivered by the demultiplexing module (block 1) is combined to extract important features in a context. For this, the categorised metadata are used to initialise a dynamically fitted chain of feature extractions adapted to the delivered video content. Those can be motion detection (e.g. Block Matching), morphology filters (e.g. Erosion), edge detection (e.g. Sobel operator), etc. As additional feature extraction, a visual attention model is implemented and used. Such a visual attention system emulates the visual system of human beings. It detects salient low level features (bottom-up features), like main orientation, colours or intensity and combine them similar to the procedure of the human eye.

Each genre type has a different combination of feature extraction methods and different parameters, which are dynamically controllable by metadata or other information obtained by extracted features. This is depicted in block 2 by a matrix allocating a genre type with specific feature extraction methods. Following, the detected features are weighted by importance, e.g. by their contextual position or size. Relevant and related features are then combined to a ROI and delivered to the tracking tool. The tracking tool identifies the new position and deformation of each initialised ROI in consecutive frames and returns this information to the feature extraction. By this, a permanent communication between feature extraction and tracking tool is guaranteed. This can be used to suppress areas for feature extraction which are already tracked. Finally, one or several ROIs are extracted. The weighting of each feature depends on the context of the present video content. It comes to the decision by an algorithm aggregating and processing all available feature extraction data and metadata. This allocations deliver decision citerions what should be an integral part and how it should be arranged in a new composed image.

Figure 5:
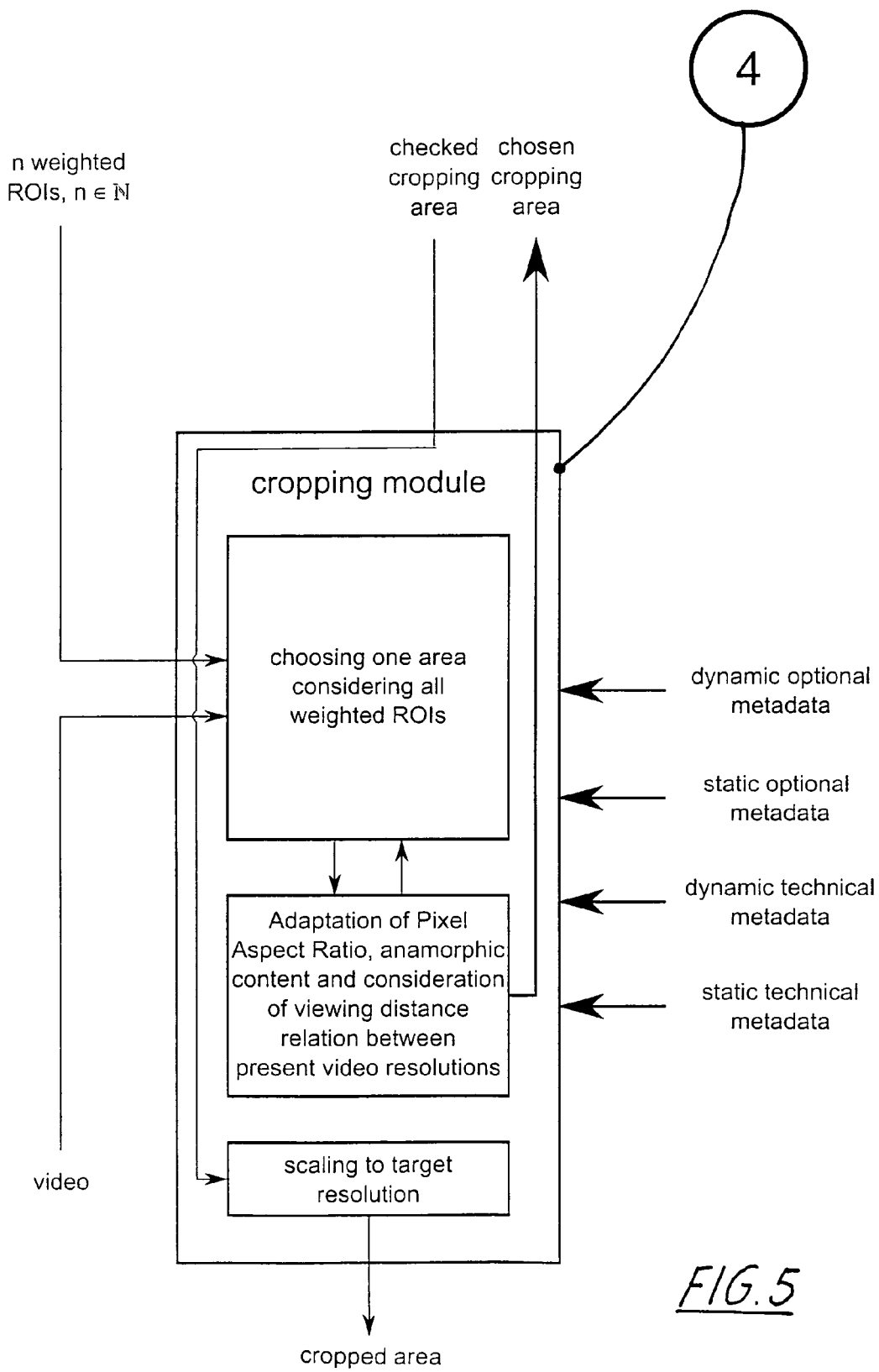

To explain the feature extraction performed in block 2 in more detail, a short example shown in FIG. 5 and treating a showjumping scene depicts a possible combination of different feature extraction methods. As already mentioned, the used methods are initialised and combined by available metadata. The most important metadata information is which type of genre is present. Here, that information is used to apply special video analysis methods to detect the position of the horse. FIG. 5 roughly explains a possible process to get the position and size of the horse and rider. Basic prerequisite in this case is that showjumping is produced with static foreground (horse) and moving background. This leads to an approach to calculate the offset of moving background between two consecutive frames (depicted with $f_0$ and $f_1$ in FIG. 2). Knowing the offset, the latter frame can be repositioned by it and subtracted from the previous one. The results are dark areas where background matches and bright areas where pixels differ from the background. After applying some filters to gain the difference between dark and bright, clearly bring out a rough shape of the horse and rider (shown at the bottom of FIG. 5). Once detected, it would be desirable to keep this ROI as long as it is visible in the following frames. For this, the tracking application is initialised receiving the initialised detected horse and matches it in consecutive frames. Updated tracking positions in subsequent frames are returned from the tracking module to the Feature Extraction Module (block 2).

Figure 4:
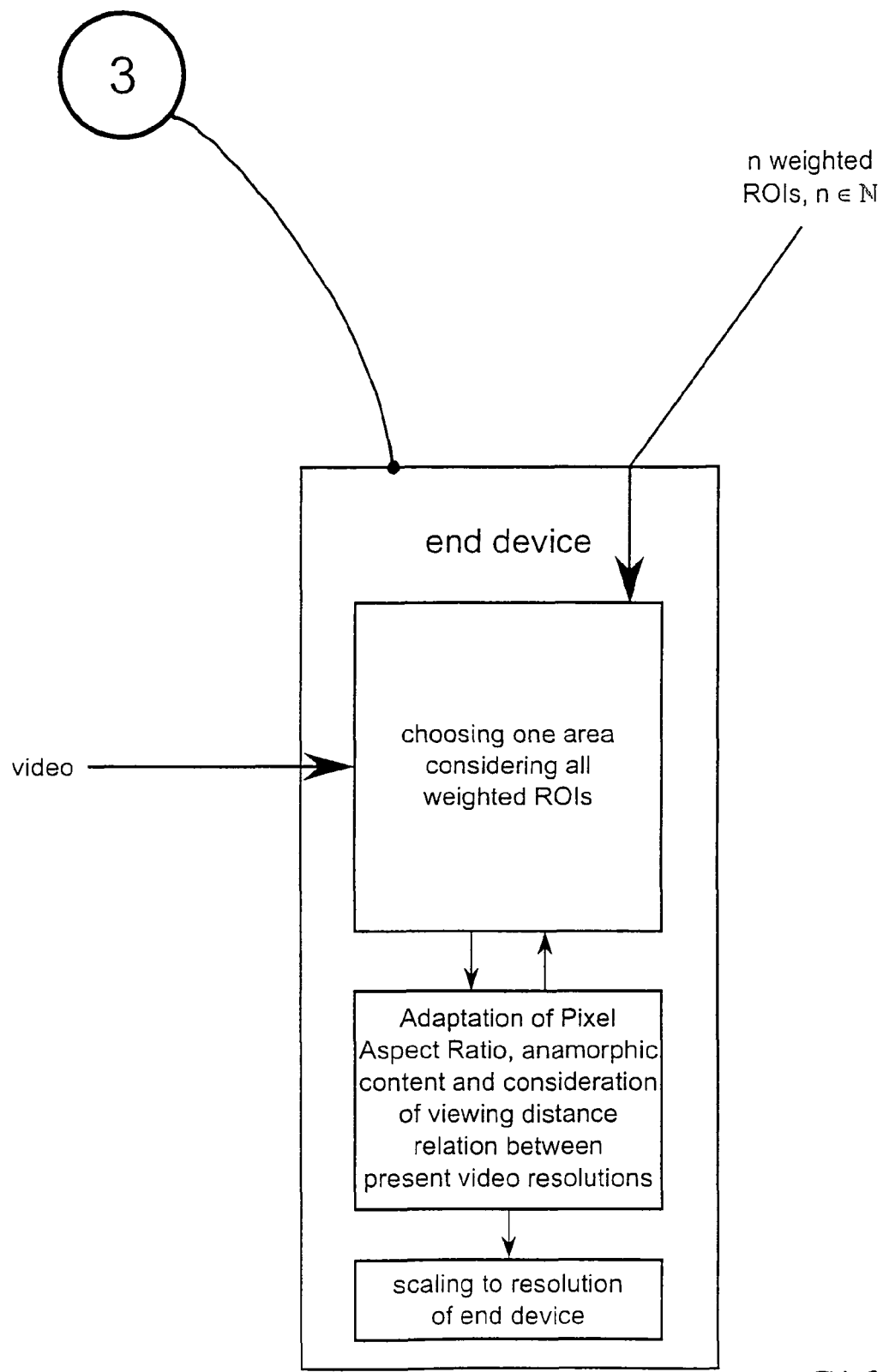

Block 3 and 4 (FIGS. 4 and 5) depict the cropping modules in detail more detail. The cropping modules mainly have the function to crop a well composed image part. For this, all received ROIs, classified by importance, are used to aid the decision of positioning the cropped area. Besides simply choosing an area for cropping, it has to be considered whether an anamorphic video is present (16:9 aspect ratio horizontally clinched to 4:3) and square or non-square pixels composes the image. Dependent of the image format of the target display, these possibilities must be considered and adapted to avoid image distortions. The cropping pocess is accomplished on the transmitter side (block 3) or on the receiving device itself (block 4). Both possibilities use the same procedure. The only difference is the way to feed information about the requirements of the end devices. On transmission side, this is done by the optional metadata which also describe the requirements of the video format for the distribution. On the end device, this information is available by the device itself. This has the advantage that the entire original video plus the ROI information is available and thus the adaption can be individually done. Compared to the option doing the processing on transmission side, the cropping area is once defined and provided to all end devices.

In addition to the cropping parameters as mentioned above, viewing conditions for the different displays have to be considered. By this, a benchmark defines which size the cropped area should have compared to the original image. Such a benchmark can be determined by a comparison of viewing distances for both display resolution. Those considerations may change the size and shape of the cropped area again and has to be adapted once more. After coming to a decision of a properly cropped area considering all content-related and technical issues, the image has to be scaled to the size of the target display.

Figure 6:
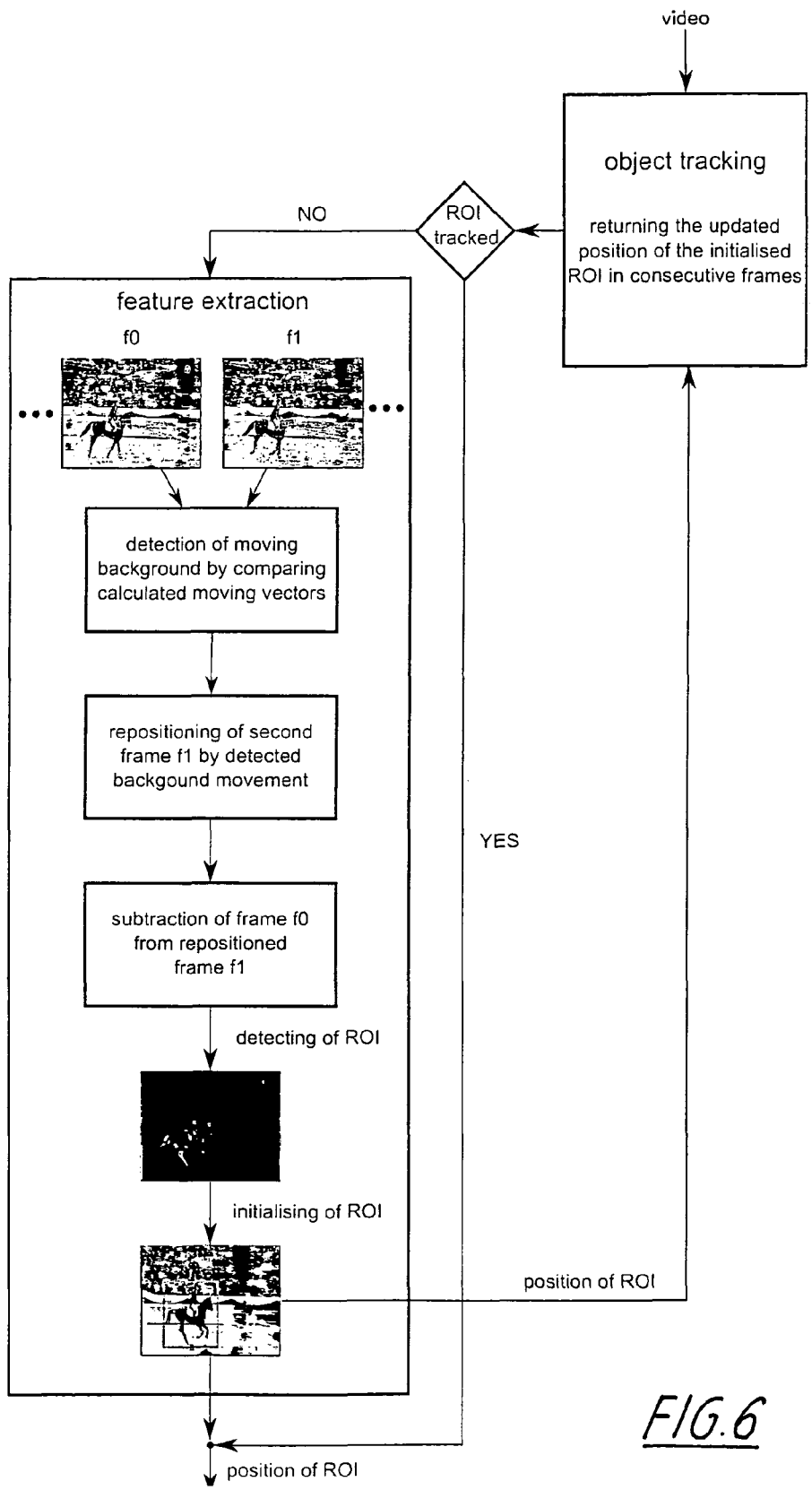
FIG. 6 illustrates an example of initialised feature extraction methods to detect a Region of Interest (ROI)
Figure 7:
FIG. 7: is a comparison of an original and a cropped image.
Figure 7:

As shown above, the example of extracting features for showjumping (FIG. 6) is a specially-tailored method and would not work properly for other types of content, e.g. soccer. Therefore, the presented approach requires metadata to choose the right extraction method for the present type of genre. In the end, it is desirable to adapt video content like depicted in FIG. 7.

The proposed methodology describes a workflow controlled by metadata. By this, a specially-tailored feature extraction and cropping method can be applied to increase the reliability of video analysis and aesthetic of the composed image.

The video analysis and cropping example of showjumping explained above is just for demonstration purposes of one possible workflow more in detail. They are not part of the patent application. Moreover, the scope of application is not limited to tv productions. The invention can be generally used where video cropping is required and metadata in a known structure is available, e.g. for web streaming or local stored videos.

The invention claimed is:

1. A method of adapting video images to small screen sizes of portable handheld terminals, said method starting from a metadata aggregation and the corresponding video, wherein
   (a) video is passed through to a video analysis unit to deliver video and metadata;
   (b) the separated video and the metadata are combined to extract features in a context, wherein metadata information from the metadata is categorized and is used to initialize a dynamically fitted chain of feature extraction steps adapted to delivered video content,
   (c) extracted features are combined to define regions of interest (ROI) which are searched in consecutive video frames by object tracking, said object tracking identifying a new position and deformation of each ROI, which are initialized, in the consecutive video frames and returns the new position and the deformation for feature extraction thereby obtaining permanent communication between said feature extraction and said object tracking,
   (d) at least one ROI is extracted and supplied, video frame by video frame, to a cropping step, (e) based on weighting information, a well composed image part is cropped by classifying said supplied at least one ROI based on at least one specified criterion, and (f) said cropped image part is scaled to a desired small screen size.

2. The method according to claim 1, wherein said metadata is distinguished in descriptive data, technical data and optional data.

3. The method according to claim 2, wherein said descriptive data is a content related description, which is either static or dynamic data, said dynamic data being data changing in time and being synchronized to the video content, and said static data being a description which is valid for the entire video, and said technical data being related to the format of the embedded video which can also be static or dynamic.

4. The method according to claim 2, wherein said technical data is used to detect scene changes in the video images.

5. The method according to claim 1, wherein said permanent communication between said feature extraction steps and said object tracking step is used to suppress feature extraction for areas which are already tracked.

6. The method according to claim 1, wherein the extracted features are weighted by their position or size, wherein relevant and related features are combined into a weighted ROI.

7. The method according to claim 1, wherein said classifying of said supplied at least one ROI in said cropping step examines whether an anamorphic video is present, the anamorphic video having a 16:9 aspect ratio horizontally clinched to 4:3, and whether square or non-square pixels compose the image, and wherein, in the scaling of the image format to the desired small screen size, the examined parameters are considered and adapted to avoid an image distortion.

8. The method according to claim 1, wherein classifying of said supplied at least one ROI in said cropping step examines viewing conditions for the different displays thereby determining a benchmark as to the size of the cropped image part as compared to the original image, the determination being made by a comparison of viewing distances for both display resolutions.

9. The method according to claim 1, wherein said method starts from the metadata aggregation and the corresponding video used in post-production or program exchange or archiving.

10. A device for adapting video images to small screen sizes of portable handheld terminals, starting from a metadata aggregation and the corresponding video, wherein the device comprises:

(a) a video analyzer that receives input video and delivering video and metadata;

(b) a feature extractor that combines said video and said metadata to extract features, and categorizes metadata information from the metadata for initializing a dynamically fitted chain of feature extractions adapted to the delivered video content;

(c) a features combiner that combines said extracted features and defines regions of interest (ROI) searched in consecutive video frames by an object tracker, said object tracker identifying a new position and deformation of each ROI, which is initialized, in consecutive video frames and returning the new position and the deformation to said feature extractor thereby obtaining permanent communication between said feature extractor and said object tracker;

(d) a cropping unit that receives at least one ROI, video frame by video frame, from said feature combiner, and based on weighting information crops a well composed image part by classifying said received at least one ROI based on at least one specified criterion, and scales said cropped image part to obtain a desired small screen size.

11. The device according to claim 10, wherein video frames corresponding to the received at least one ROI are sent to a receiving device including a cropping unit, and the cropping unit of the receiving device, based on the weighting information, crops another well composed image part by classifying the received at least one ROI based on the at least one specified criterion, and scales said cropped image part to obtain the desired small screen size.

* * * * *

UNITED STATES PATENT AND TRADEMARK OFFICE
CERTIFICATE OF CORRECTION

PATENT NO.         : 8,432,492 B2                                           Page 1 of 1
APPLICATION NO.    : 12/933539
DATED              : April 30, 2013
INVENTOR(S)        : Deigmoeller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 136 days.

Signed and Sealed this

Eighth Day of September, 2015

Michelle K. Lee
*Director of the United States Patent and Trademark Office*